(12) United States Patent
Park et al.

(10) Patent No.: US 11,487,133 B2
(45) Date of Patent: Nov. 1, 2022

(54) CAMERA MODULE

(71) Applicant: Samsung Electro-Mechanics Co., Ltd., Suwon-si (KR)

(72) Inventors: Jung Hyun Park, Suwon-si (KR); Seok Cheon Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/201,257

(22) Filed: Mar. 15, 2021

(65) Prior Publication Data

US 2022/0099992 A1    Mar. 31, 2022

(30) Foreign Application Priority Data

Sep. 25, 2020   (KR) .......................... 10-2020-0124592

(51) Int. Cl.
*G02B 27/64* (2006.01)
*G02B 7/09* (2021.01)
(Continued)

(52) U.S. Cl.
CPC ............ *G02B 27/646* (2013.01); *F16C 19/02* (2013.01); *G02B 7/09* (2013.01); *G03B 5/02* (2013.01);
(Continued)

(58) Field of Classification Search
CPC .......... G03B 5/00; G03B 5/02; G02B 27/646; G02B 7/09; F16C 19/00; F16C 19/02; H04N 5/2328; H04N 5/23287
See application file for complete search history.

(56) References Cited

U.S. PATENT DOCUMENTS

2007/0236577 A1* 10/2007 Ke ..................... H04N 5/23287
                                                                348/208.99
2017/0104934 A1*  4/2017 Oda ........................ H01L 41/09
(Continued)

FOREIGN PATENT DOCUMENTS

CN          111045185 A  *  4/2020
JP          2014-10380 A     1/2014
(Continued)

OTHER PUBLICATIONS

Overview of materials for Polytetrafluoroethylene (PTFE), Molded http://www.matweb.com/search/datasheet_print.aspx?matguid=4d14eac958e5401a8fd152e1261b6843 printed Feb. 2, 2022.*
(Continued)

*Primary Examiner* — Christopher E Mahoney
(74) *Attorney, Agent, or Firm* — NSIP Law

(57) ABSTRACT

A camera module includes a housing, a carrier, a frame, a lens holder, an autofocusing (AF) ball bearing, and an optical image stabilization (OIS) ball bearing. The carrier is coupled to the housing and configured to move in an optical axis direction. The frame is coupled to the carrier and configured to move in a first axis direction, perpendicular to the optical axis direction. The lens holder is coupled to the frame and configured to move in a second axis direction, perpendicular to the optical axis and the first axis. The AF ball bearing is disposed between the housing and the carrier. The OIS ball bearing is disposed on either one or both of the carrier and the frame, and the frame and the lens holder. Either one or both of the AF ball bearing and the OIS ball bearing have an elastic modulus of 20 GPa or less.

11 Claims, 6 Drawing Sheets

(51) Int. Cl.
  *H04N 5/232* (2006.01)
  *F16C 19/02* (2006.01)
  *G03B 5/02* (2021.01)

(52) U.S. Cl.
  CPC . *H04N 5/23287* (2013.01); *G03B 2205/0015* (2013.01)

(56) References Cited

U.S. PATENT DOCUMENTS

| | | |
|---|---|---|
| 2018/0356609 A1 | 12/2018 | Kim et al. |
| 2019/0243216 A1 | 8/2019 | Köpfer |
| 2020/0050083 A1 | 2/2020 | Jeong et al. |
| 2021/0149150 A1* | 5/2021 | Park ..................... G03B 3/10 |

FOREIGN PATENT DOCUMENTS

| | | |
|---|---|---|
| KR | 10-1451652 B1 | 10/2014 |
| KR | 10-2018-0081834 A | 7/2018 |
| KR | 10-2018-0135299 A | 12/2018 |
| KR | 10-2019-0094362 A | 8/2019 |
| KR | 10-2063411 B1 | 1/2020 |
| KR | 10-2020-0016625 A | 2/2020 |
| WO | WO 2020/190569 A1 | 9/2020 |

OTHER PUBLICATIONS

Korean Office Action dated Dec. 18, 2021 in the corresponding Korean Patent Application No. 10-2020-0124592.

* cited by examiner

CAMERA MODULE

CROSS-REFERENCE TO RELATED APPLICATIONS

This application claims the benefit under 35 USC 119(a) of Korean Patent Application No. 10-2020-0124592 filed on Sep. 25, 2020, in the Korean Intellectual Property Office, the entire disclosure of which is incorporated herein by reference for all purposes.

BACKGROUND

1. Field

The present disclosure relates to a camera module.

2. Description of Related Art

Cameras are now commonly installed in portable electronic devices such as smartphones, tablet PCs, notebook computers, and the like. An autofocusing function, an optical image stabilization function, a zoom function, and the like are generally added to mobile terminals' cameras.

A ball-type actuator is typically used as a driver to achieve autofocusing (AF) and optical image stabilization (OIS). The ball-type actuator supports a driving body with a plurality of ball bearings.

However, damage may occur on the surface of the driving body, that is, on the surface of a rolling unit of the ball bearing caused by the ball bearing due to external impacts.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing, a carrier, a frame, a lens holder, an autofocusing (AF) ball bearing, and an optical image stabilization (OIS) ball bearing. The carrier is coupled to the housing and configured to move in an optical axis direction. The frame is coupled to the carrier and configured to move in a first axis direction perpendicular to the optical axis direction. The lens holder is coupled to the frame and configured to move in a second axis direction perpendicular to the optical axis and the first axis. The AF ball bearing is disposed between the housing and the carrier. The OIS ball bearing is disposed on either one or both of the carrier and the frame, and the frame and the lens holder. Either one or both of the AF ball bearing and the OIS ball bearing have an elastic modulus of 20 GPa or less, and contain a polymer material.

Either one or both of the AF ball bearing and the OIS ball bearing may be made of an organic polymer material.

Either one or both of the AF ball bearing and the OIS ball bearing may be made of a thermoplastic or thermosetting polymer material.

Either one or both of the AF ball bearing and the OIS ball bearing may be made of a polymer material containing an inorganic filler.

The camera module may further include a focus adjustment coil disposed on one surface of the housing, and a focus adjustment magnet, disposed opposite to the focus adjustment coil, provided on the carrier. The AF ball bearing may be disposed on both sides of the focus adjustment coil and the focus adjustment magnet.

The AF ball bearing may include a plurality of AF ball bearings disposed on both sides of the focus adjustment coil and the focus adjustment magnet.

The AF ball bearing may include a first AF ball bearing and a second AF ball bearing having a smaller size than the first AF ball bearing.

A predetermined number of the first AF ball bearing and the second AF ball bearing may be respectively disposed on one side of the focus adjustment coil and the focus adjustment magnet.

The predetermined number of the first AF ball bearing and the second AF ball bearing may be four.

An equal number of the first AF ball bearing and the second AF ball bearing may be disposed on the one side of the focus adjustment coil and the focus adjustment magnet.

A predetermined number of the first AF ball bearing and the second AF ball bearing may be respectively disposed on another side of the focus adjustment coil and the focus adjustment magnet.

The predetermined number of the first AF ball bearing and the second AF ball bearing may be four.

An equal number of the first AF ball bearing and the second AF ball bearing may be disposed on the one side of the focus adjustment coil and the focus adjustment magnet.

The OIS ball bearing may include a first ball member disposed between the carrier and the frame, and a second ball member disposed between the frame and the lens holder.

The first ball member may include a plurality of first ball members, and the second ball members may include a plurality of second ball members. The plurality of first ball members may be disposed on an upper surface of the carrier and a corner of a bottom surface of the frame, and the plurality of second ball members may be disposed on an upper surface of the frame and a corner of a bottom surface of the lens holder.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
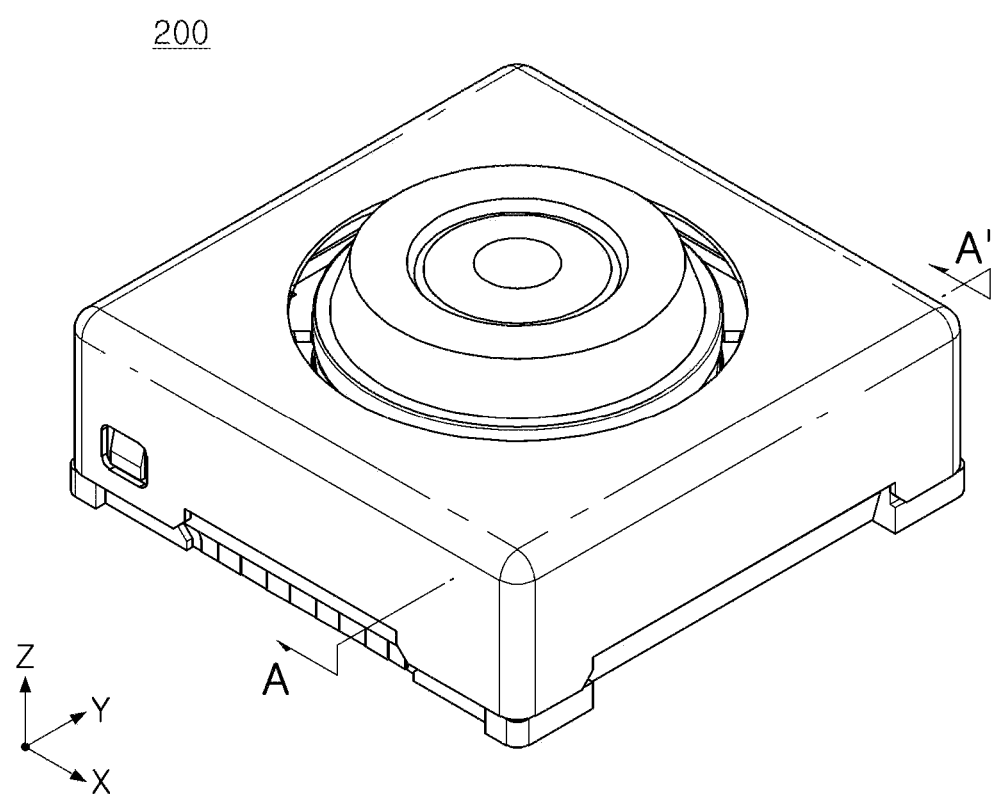
FIG. 1 is a perspective view illustrating a camera of a sensing device according to one or more embodiments of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

An aspect of the present disclosure is to provide a camera module for preventing damage to a surface of a rolling portion by a ball bearing.

Figure 2:
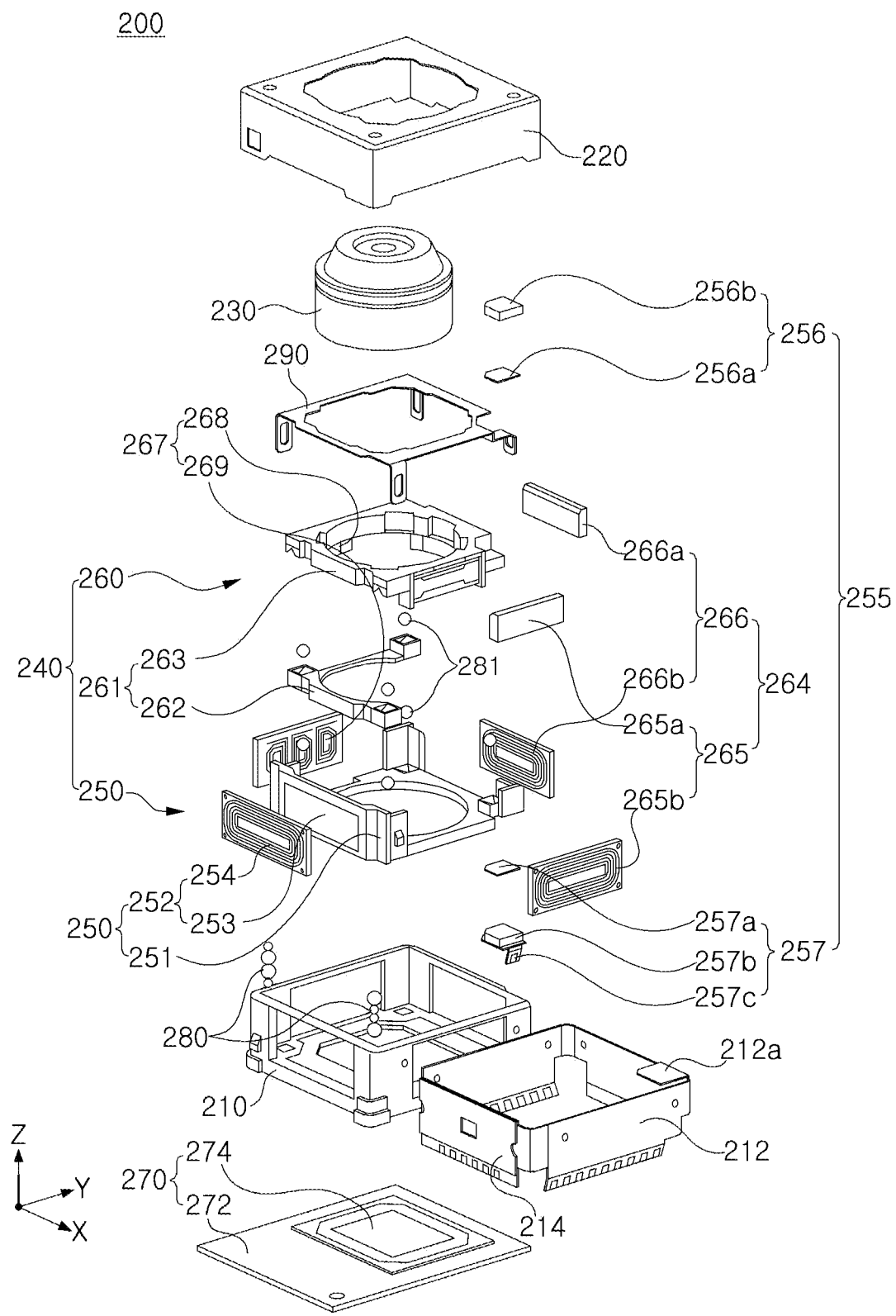
FIG. 2 is an exploded perspective view illustrating a camera of a sensing device according to one or more embodiments of the present disclosure.

FIG. 1 is a perspective view illustrating a camera of a sensing device according to one or more embodiments of the present disclosure, and FIG. 2 is an exploded perspective view illustrating a camera of the sensing device according to one or more embodiments of the present disclosure.

In FIGS. 1 and 2, a camera 200 may include a housing 210, a shield case 220, a lens barrel 230, a lens driving device 240, and an image sensor unit 270.

The housing 210 may be formed to have an internal space in which the lens barrel 230 and the lens driving device 240 can be accommodated. As an example, the housing 210 may have a hexahedral box shape with six open surfaces. In addition, the housing 210 may be made of a plastic material. As an example, a bottom surface of the housing 210 may be open for the image sensor unit 270, and four sides of the housing 210 may be open for installation of the lens driving device 240.

The shield case 220 is coupled to the housing 210 to surround an outer surface of the housing 210, and serves to protect internal components of the camera 200. In addition, the shield case 220 may perform the function of shielding electromagnetic waves. For example, the case 210 may shield the electromagnetic waves so that the electromagnetic waves generated by the camera 200 do not affect other electronic components in the portable electronic device.

The shield case 220 may be made of a metallic material, and may be grounded to a ground pad provided on the printed circuit board 274 of the image sensor unit 270 to be described later, thereby shielding electromagnetic waves.

However, the present disclosure is not limited thereto, and the shield case 220 may also be formed of a plastic injection product. In this case, a conductive paint may be applied to an inner surface of the shield case 220, or a conductive film or a conductive tape may be attached to the inner surface of the shield case 220 to shield electromagnetic waves. In this case, conductive epoxy may be used as the conductive paint, but the present disclosure is not limited thereto, and various materials having conductivity may be used.

The lens barrel 230 may have a hollow cylindrical shape. A plurality of lenses for imaging a subject may be accommodated in the lens barrel 230, and the plurality of lenses is mounted on the lens barrel 230 along the optical axis (Z-axis). As many lenses as necessary are disposed in the plurality of lenses, according to the design of the lens barrel 230, and each of the lenses has optical characteristics such as the same or different refractive indices.

The lens driving device 240 is a device configured to move the lens barrel 230. As an example, the lens driving device 240 may adjust a focus by moving the lens barrel 230 in the optical axis (Z-axis) direction, and correct shaking during capturing by moving the lens barrel 230 in a direction perpendicular to the optical axis (Z-axis) direction. The lens driving device 240 includes a focus adjustment unit 250 configured to adjust a focus, and a shake correction unit 260 configured to correct shaking. A detailed description of the focus adjustment unit 250 and the shake correction unit 260 will be further described later.

The image sensor unit 270 converts light incident through the lens barrel 230 into an electrical signal. For example, the image sensor unit 270 may include an image sensor 272 and a printed circuit board 274, and may further include an infrared filter (not shown). The image sensor 272 may be installed on the printed circuit board 274, and an infrared filter (not shown) serves to block light in the infrared spectrum, incident through the lens barrel 230, from entering the image sensor 272. The image sensor 272 converts light incident through the lens barrel 230 into an electrical signal. For example, the image sensor 272 may be a charge-coupled device (CCD) or a complementary metal-oxide semiconductor (CMOS) device.

The electrical signal converted by the image sensor 272 is finally transmitted to an Advanced Driver Assistant System (ADAS). The image sensor 272 is fixed to the printed circuit board 274, and is electrically connected to the printed circuit board 274 by wire bonding.

Hereinafter, a lens driving device will be described in more detail with reference to the drawings.

Figure 3:
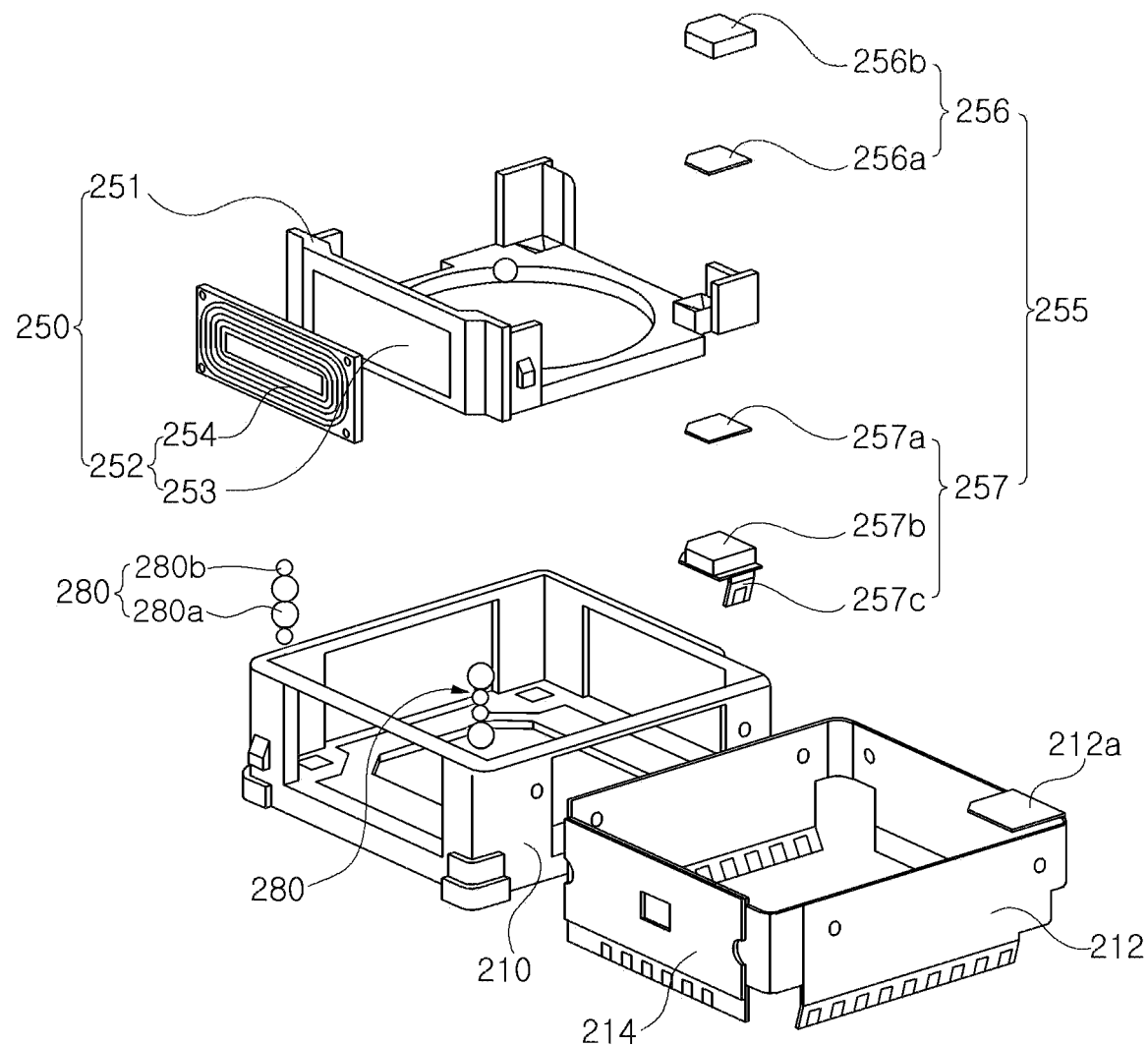
FIG. 3 is an enlarged exploded perspective view illustrating a focus adjustment unit provided in the camera module according to a first embodiment of the present disclosure.
Figure 4:
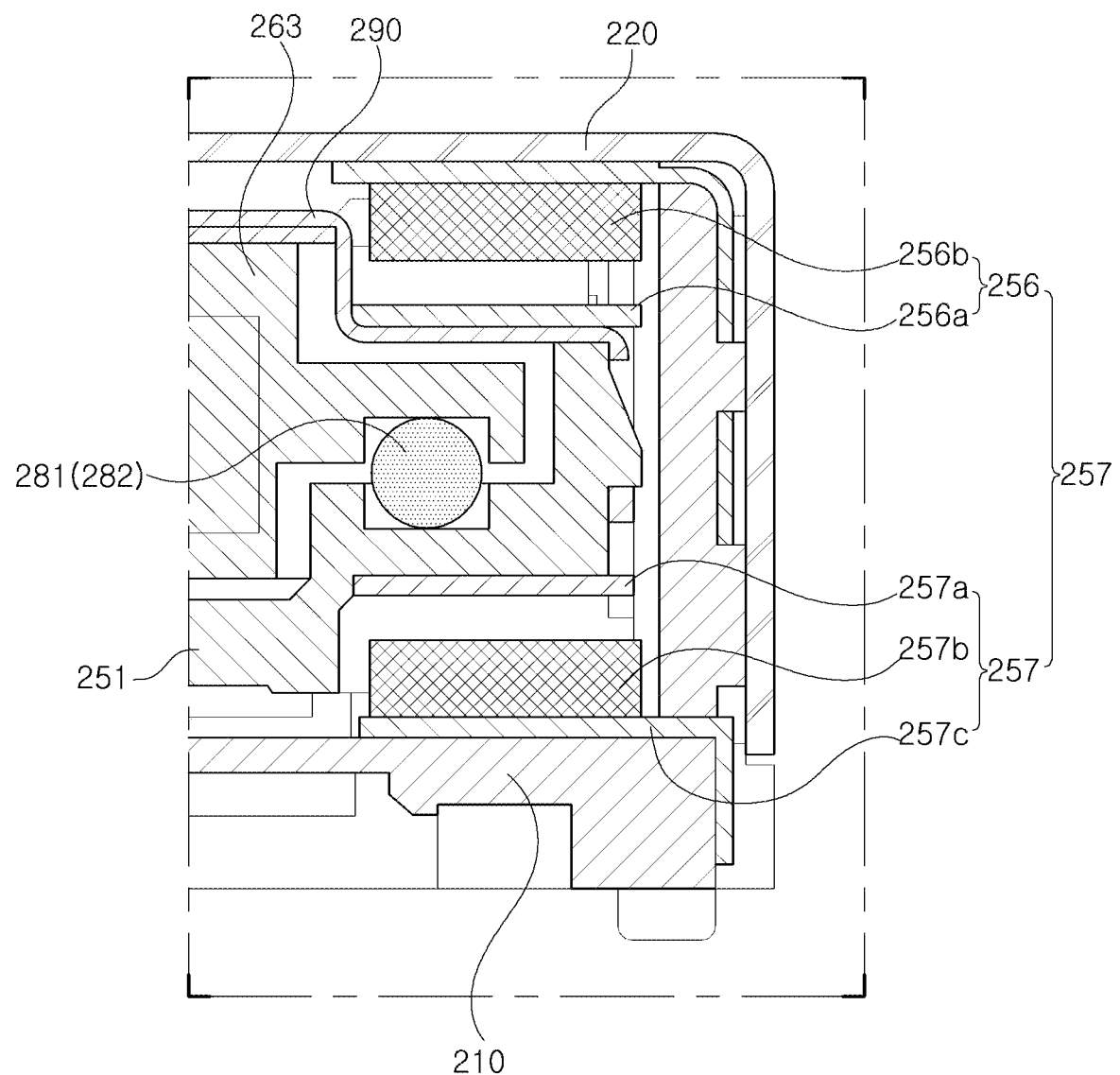
FIG. 4 is a cross-sectional view taken along line A-A' of FIG. 1.

FIG. 3 is an enlarged exploded perspective view illustrating a focus adjustment unit provided in the camera module according to a first embodiment of the present disclosure. FIG. 4 is a cross-sectional view taken along line A-A' of FIG. 1.

In FIGS. 3 and 4, a lens driving device 240 (see FIG. 2) moves a lens barrel 230 (see FIG. 2) to focus on a subject.

For example, in the present disclosure, a focus adjustment unit 250 for moving the lens barrel 230 in an optical axis (Z-axis) direction. The focus adjustment unit 250 includes a carrier 251 accommodating the lens barrel 230, and a focus adjustment driving unit 252. The focus adjustment driving unit 252 generates a driving force to move the lens barrel 230 and the carrier 251 in the optical axis (Z-axis) direction.

The focus adjustment driving unit 252 includes a focus adjustment magnet 253 installed on any one of the carrier 251 and the housing 210, and a focus adjustment coil 254 disposed opposite to the focus adjustment magnet 253.

The focus adjustment magnet is mounted on the carrier 251. As an example, the focus adjustment magnet 253 may be mounted on one surface of the carrier 251.

The focus adjustment coil 254 is mounted on the housing 210. For example, the focus adjustment coil 254 may be mounted on the housing 210 via the substrate 212.

The focus adjustment magnet 253 is a moving member mounted on the carrier 251 and moving in the optical axis (Z-axis) direction together with the carrier 251. The focus adjustment coil 254 is a fixed member fixed to the housing 210. However, the present disclosure is not limited thereto, and the installation positions of the focus adjustment magnet 253 and the focus adjustment coil 254 may also be changed.

Further, when power is applied to the focus adjustment coil 254, the carrier 251 may be moved in the optical axis (Z-axis) direction due to an electromagnetic influence between the focus adjustment magnet 253 and the focus adjustment coil 254.

Since the lens barrel 230 is accommodated in the carrier 251, the lens barrel 230 is also moved in the optical axis (Z-axis) direction by the movement of the carrier 251.

When the carrier 251 is moved, an autofocusing (AF) ball bearing 280 is disposed between the carrier 251 and the housing 210 to reduce friction between the carrier 251 and the housing 210. The AF ball bearing 280 may have a ball shape.

Further, the AF ball bearing 280 may include a plurality of AF ball bearings 280 that are disposed on both sides of the focus adjustment magnet 253. For example, the plurality of AF ball bearings 280 may be disposed to form one row on both sides of the focus adjustment magnet 253.

In a non-limiting example, four AF ball bearings 280 may be disposed on each of both sides of the focus adjustment magnet 253. Further, the AF ball bearings 280 may include a first AF ball bearing 280a and a second AF ball bearing 280b having a size smaller than that of the first AF ball bearing 280a. As an example, four AF ball bearings 280 may be disposed in order of a first AF ball bearing 280a, a second AF ball bearing 280b, a second AF ball bearing 280b, and a first AF ball bearing 280a on one side of the focus adjustment magnet 253. As an example, AF four ball bearings 280 may be disposed in order of a second AF ball bearing 280b, a first AF ball bearing 280a, a first AF ball bearing 280a, and a second AF ball bearing 280b on the other side of the focus adjustment magnet 253. However, the present disclosure is not limited thereto, and the number and size of the AF ball bearings 280 may be variously changed.

The AF ball bearing 280 may be made of a material having elasticity in order to prevent damage by the AF ball bearing 280 to the carrier 251 and the housing 210 due to an external impact. As an example, the AF ball bearing 280 may contain a polymer material. Furthermore, the AF ball bearing 280 may have an elastic modulus of 20 GPa or less.

For example, the AF ball bearing 280 may be an organic polymer material and may be a thermoplastic or thermosetting organic polymer material.

In addition, the AF ball bearing 280 may be made of a polymer material containing an inorganic filler. In this case, the polymer is 30% or less based on the mass of the composition. The size thereof is less than 5 μm, and the long axis/short axis ratio of the isotropic material does not exceed 1:2, which is to maintain the sphericity of the ball bearings.

As an example, the AF ball bearing 280 may be made of any one of polyurethane (PU), polyimide (PI), and an epoxy resin, which are thermoplastic organic polymer materials.

Alternatively, the AF ball bearing 280 may be made of any one material of polystyrene (PS), polymethylmethacrylate (PMMA), polyacetal, (POM), polytetrafluoroethylene (PTFE), acrylic resin (Acrylic), ABS, polycarbonate (PC), polybutylene terephthalate (PBT), and a PEEK single resin, which are thermosetting organic polymer materials.

The AF ball bearing 280 may have a heat deflection temperature of 80° C. or higher.

Accordingly, even if the AF ball bearing 280 applies an impact to the carrier 251 and the housing 210 during an external impact, it is possible to prevent surface deformation due to the AF ball bearing 280 in the carrier 251 and the housing 210. It is possible to prevent the occurrence of scratches or the like by the AF ball bearing 280 on surfaces of the carrier 251 and the housing 210. Consequently, it is possible to prevent the occurrence of driving failure of the carrier 251 due to surface deformation.

Details thereof will be described later.

A focus adjustment yoke 214 is disposed in the housing 210. As an example, the focus adjustment yoke 214 is disposed to face the focus adjustment magnet 253 with the focus adjustment coil 254 therebetween.

An attractive force acts in a direction perpendicular to the optical axis (Z-axis) between the focus adjustment yoke 214 and the focus adjustment magnet 253. Accordingly, the AF ball bearing 280 can maintain a contact state with the carrier 251 and the housing 210 by the attractive force between the focus adjustment yoke 214 and the focus adjustment magnet 253.

In addition, the focus adjustment yoke 214 also functions to focus the magnetic force of the focus adjustment magnet 253. Accordingly, it is possible to reduce the occurrence of leakage magnetic flux. For example, the focus adjustment yoke 214 and the focus adjustment magnet 253 form a magnetic circuit. In this case, the length of the focus adjustment yoke 214 in the optical axis (Z-axis) direction may be longer than the length of the focus adjustment magnet 253 in the optical axis (Z-axis) direction.

The focus adjustment unit 250 further includes a focus adjustment sensing unit 255 disposed in a region other than a surface on which the focus adjustment magnet 253 and the focus adjustment coil 254 are installed.

As an example, the focus adjustment sensing unit 255 includes a first focus adjustment sensing unit 256 disposed at an upper end portion of the housing 210, and a second focus adjustment sensing unit 257 disposed to be spaced apart from a lower portion of the first focus adjustment sensing unit 256.

Further, the AF ball bearing 280 provided in the shake correction unit 260 to be described later is provided as shown in more detail in FIG. 5 may be disposed between the first focus adjustment sensing unit 256 and the second focus adjustment sensing unit 257.

The first focus adjustment sensing unit 256 includes a first focus adjustment sensing yoke 256a installed on an upper end portion of the housing 210, and a first focus adjustment sensing coil 256b disposed opposite to the first focus adjustment sensing yoke 256a.

Further, the second focus adjustment sensing unit 257 includes a second focus adjustment sensing yoke 256a installed on an upper end portion of the housing 210, and a second focus adjustment sensing coil 257b disposed opposite to the second focus adjustment sensing yoke 257a.

In addition, the second focus adjustment sensing unit 257 may further include a connection substrate 257c connected to the substrate 212 on which the focus adjustment coil 254 is mounted. In addition, the first focus adjustment sensing unit 256 may be connected to a connection unit 212a of the substrate 212.

Further, since the first focus adjustment sensing unit 256 and the second focus adjustment sensing unit 257 differ only in the installed position, only the first focus adjustment sensing unit 256 will be described below, and a detailed description of the second focus adjustment sensing 257 will be omitted.

The first focus adjustment sensing coil 256b may include at least two or more coils. The inductance of the first focus adjustment sensing coil 256b may be changed according to the displacement of the first focus adjustment sensing yoke 256a.

Further, in the present disclosure, a closed-loop control method senses and feeds back a position of the lens barrel 230. Accordingly, a focus adjustment sensing unit 255 for closed-loop control is provided.

Looking at the closed-loop control in more detail, when the power of the camera 200 is turned on, an initial position of the lens barrel 230 is sensed by the focus adjustment sensing unit 255. Then, the lens barrel 230 is moved from the sensed initial position to an initial setting position. Here, the initial position may refer to a position of the lens barrel 230 in the optical axis direction when the camera 200 is turned on, and the initial setting position may refer to a position at which the focus of the lens barrel 230 becomes infinite.

The lens barrel 230 is moved from the initial setting position to a target position by a driving signal of the circuit element.

During the focus adjustment process, the lens barrel 230 can move forward and backward in the optical axis (Z-axis) direction (i.e., the lens barrel 230 can move in both directions).

Figure 5:
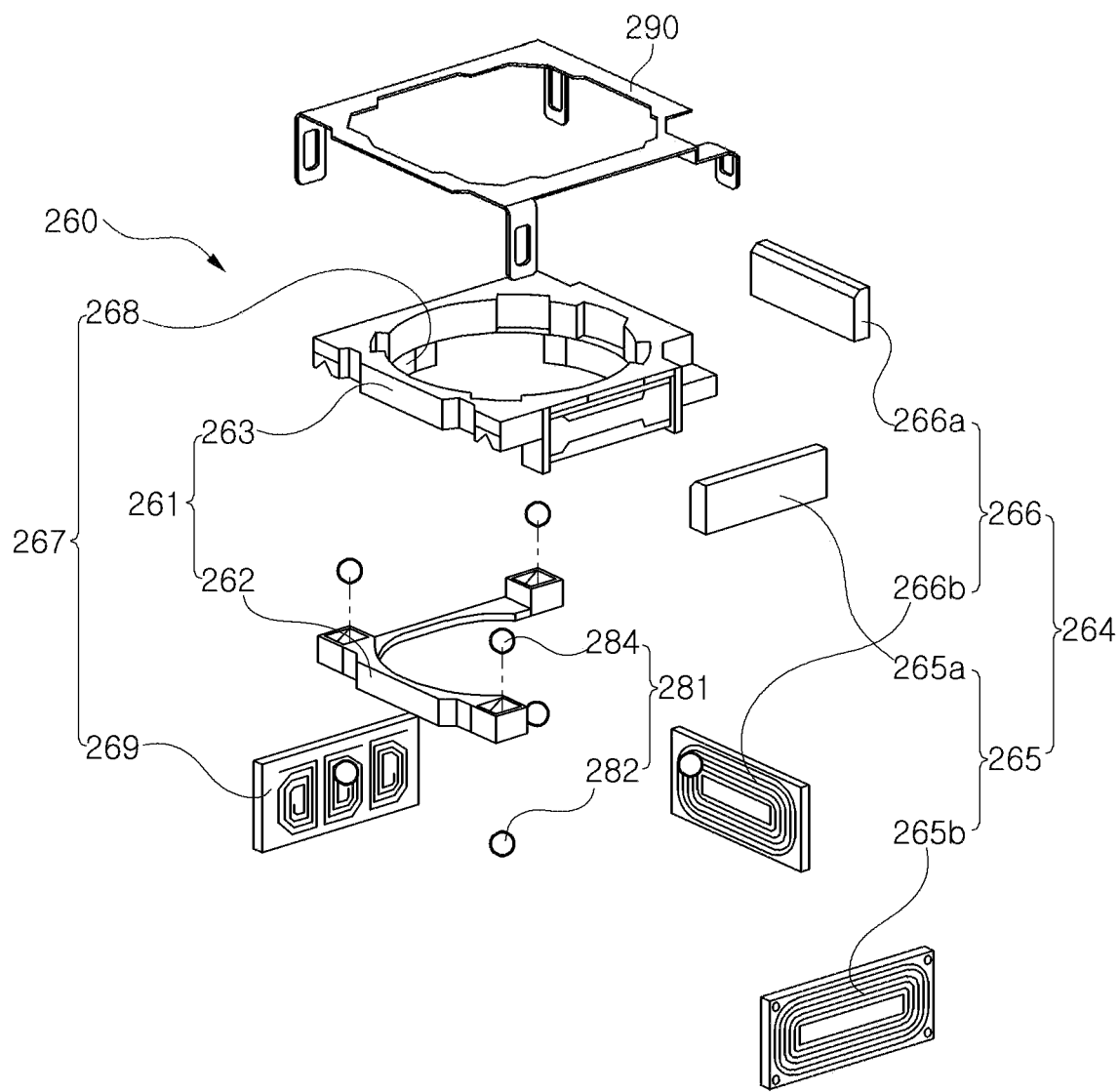
FIG. 5 is an enlarged exploded perspective view illustrating a shake correction unit provided in the camera module according to the first embodiment of the present disclosure.

FIG. 5 is an enlarged exploded perspective view illustrating a shake correction unit provided in a camera module according to a first embodiment of the present disclosure.

The shake correction unit 260 is used to correct blurring of an image or shaking of a moving picture due to factors such as vibrations during image capturing or moving picture capturing. For example, the shake correction unit 260 compensates shaking by applying a relative displacement corresponding to the shaking to the lens barrel 230 when shaking occurs during image capturing due to vibrations or the like. As an example, the shake correction unit 260 corrects shaking by moving the lens barrel 230 in a direction perpendicular to the optical axis (Z-axis).

In FIG. 5, the shake correction unit 260 includes a guide member 261 guiding a movement of the lens barrel 230, and a shake correction driving unit 264 generating a driving force to move the guide member 261 in a direction perpendicular to the optical axis (Z-axis).

The guide member 261 includes a frame 262 and a lens holder 263. The frame 262 and the lens holder 263 are inserted into the carrier 251 and disposed in the optical axis (Z-axis) direction, and function to guide the movement of the lens barrel 230.

The frame 262 and the lens holder 263 have a space into which the lens barrel 230 may be inserted. The lens barrel 230 is fixed to the lens holder 263.

The frame 262 and the lens holder 263 are moved in the carrier 251 in a direction perpendicular to the optical axis (Z-axis) by the driving force generated by the shake correction driving unit 264.

The shake correction driving unit 264 includes a first shake correction driving unit 265 generating a driving force in the direction of a first axis (X-axis) perpendicular to the optical axis (Z-axis), and a second shake correction driving unit 266 generating a driving force in a direction of a second axis (Y-axis) perpendicular to both the optical axis (Z-axis) and the first axis (X-axis).

The first shake correction driving unit 265 generates a driving force in a direction of a first axis (X-axis) perpendicular to the optical axis (Z-axis). The second shake correction driving unit 266 generates a driving force in the direction of a second axis (Y-axis) perpendicular to the first axis (X-axis).

Here, the second axis (Y-axis) refers to an axis perpendicular to both the optical axis (Z-axis) and the first axis (X-axis).

The first shake correction driving unit 265 and the second shake correction driving unit 266 are disposed to be orthogonal to each other in a plane perpendicular to the optical axis (Z-axis).

As an example, the first shake correction driving unit 265 includes a first shake correction magnet 265a installed on any one of the lens holder 263 and the housing 210, and a first shake correction coil 265b disposed opposite to the first shake correction magnet 265a.

The second shake correction driving unit 266 includes a second shake correction magnet 266a installed on any one of the lens holder 263 and the housing 210, and a second shake correction coil 266b disposed opposite to the second shake correction magnet 266a.

Further, the first and second shake correction magnets 265a and 266a are mounted on the lens holder 263, and the first and second shake correction coils 265b and 266b disposed opposite to the first and second shake correction magnets 265a and 266a are mounted on the housing 210. As an example, the first and second shake correction coils 265b and 266b are mounted on the housing 210 via the substrate 212.

The first and second shake correction magnets 265a and 266a are moving members that are moved in a direction perpendicular to the optical axis (Z-axis) together with the lens holder 263. The first and second shake correction coils 265b and 266b are fixed members that are fixed to the housing 210. However, the present disclosure is not limited thereto, and the positions of the first and second shake correction magnets 265a and 266a and the first and second shake correction coils 265b and 266b may also be changed.

The shake correction unit 260 further includes a shake correction sensing sensor unit 267 including a shake correction sensing yoke 268 installed on the lens holder 263 and a shake correction sensing coil 269 disposed opposite to the shake correction sensing yoke 268.

As an example, the shake correction sensing yoke 268 may be disposed on a surface of the lens holder 263 orthogonal to one surface of the carrier 251 on which the focus adjustment magnet 253 is installed.

Further, the shake correction sensing coil 269 is mounted on the housing 210 via the substrate 212. The shake correction sensing coil 269 is a fixed member, and the shake correction sensing yoke 268 is a moving member.

In the lens driving apparatus 240 of the present disclosure, a closed-loop control method in which the position of the lens barrel 230 is sensed and fed back during the shake correction process is used. To this end, the shake correction sensing sensor unit 267 described above is provided.

Looking in more detail with respect to the closed-loop control, when the power of the camera 200 is turned on, an initial position of the lens barrel 230 is sensed by the shake correction sensing sensor unit 267. The lens barrel 230 is moved from the sensed initial position to an initial setting position. Here, the setting position may mean a center of a movable range in the first axis (X-axis) and a center of a movable range in the second axis (Y-axis). Mechanically, the setting position may mean a center in a first axis (X-axis) direction and a center in a second axis (Y-axis) direction of the carrier 251 in which the shake correction unit 260 is accommodated.

Further, a plurality of OIS ball bearings 281 supporting the shake correction unit 260 are provided. The plurality of OIS ball bearings 281 function to guide the frame 262 and the lens holder 263 in the shake correction process. In addition, the plurality of OIS ball bearings 281 may also function to maintain a gap between the carrier 251, the frame 262, and the lens holder 263.

The plurality of OIS ball bearings 281 include a first ball member 282 and a second ball member 284.

The first ball member 282 guides the movement of the shake correction unit 260 in the first axis (X-axis) direction, and the second ball member 284 guides the movement of the shake correction unit 260 in the second axis (Y-axis) direction.

For example, the first ball member 282 rolls in the first axis (X-axis) direction when the driving force in the first axis (X-axis) direction is generated. Accordingly, the first ball member 282 guides the movement of the frame 262 and the lens holder 263 in the first axis (X-axis) direction.

In addition, the second ball member 284 rolls in the second axis (Y-axis) direction when the driving force in the second axis (Y-axis) direction is generated. Accordingly, the second ball member 284 guides the movement of the lens holder 263 in the second axis (Y-axis) direction.

The first ball member 282 includes a plurality of ball members disposed between the carrier 251 and the frame 262, and the second ball member 284 disposed between the frame 262 and the lens holder 263.

The plurality of OIS ball bearings 281 may be made of a material having elasticity to prevent damage caused by the plurality of OIS ball bearing 281 to the carrier 251, the frame 262, and the lens holder 263 due to external impact. As an example, the OIS ball bearing 281 may contain a polymer material. Further, the OIS ball bearings 281 may have an elastic modulus of 20 GPa or less.

For example, the OIS ball bearings 281 may be made of an organic polymer and may be made of a thermoplastic or thermosetting organic polymer.

The OIS ball bearings 281 may be made of a polymer material containing an inorganic filler. In this case, the polymer is 30% or less based on a mass of the composition, the size thereof is less than 5 μm, and a long axis/short axis ratio of an isotropic material does not exceed 1:2, which is to maintain sphericity of a ball.

As an example, the OIS ball bearings 281 may be made of any one material of polyurethane (PU), polyimide (PI), and an epoxy resin, which are thermoplastic organic polymer materials.

Alternatively, the OIS ball bearings 281 may be made of any one material of polystyrene (PS), polymethylmethacrylate (PMMA), polyacetal (POM), polytetrafluoroethylene (PTFE), acrylic resin (Acrylic), ABS, polycarbonate (PC), polybutylene terephthalate (PBT), and a PEEK single resin, which are thermosetting organic polymer materials.

The OIS ball bearings 281 may have a heat deflection temperature of 80° C. or higher.

Accordingly, even if the plurality of OIS ball bearings 281 apply an impact to the carrier 251, the frame 262, and the lens holder 263 during an external impact, the occurrence of surface deformation to the carrier 251, the frame 262, and the lens holder 263 due to the plurality of OIS ball bearings 281 may be prevented. That is, it is possible to prevent the occurrence of scratches or the like by the plurality of OIS ball bearings 281 on surfaces of the carrier 251, the frame 262, and the lens holder 263. As a result, it is possible to prevent the occurrence of driving failure of the carrier 251, the frame 262, and the lens holder 263 due to surface deformation.

Further, in the present disclosure, a stopper 290 is provided to prevent the plurality of OIS ball bearings 281, the frame 262, and the lens holder 263 from being separated from the outside of the carrier 251 due to an external impact, or the like (see FIG. 2).

Figure 6:
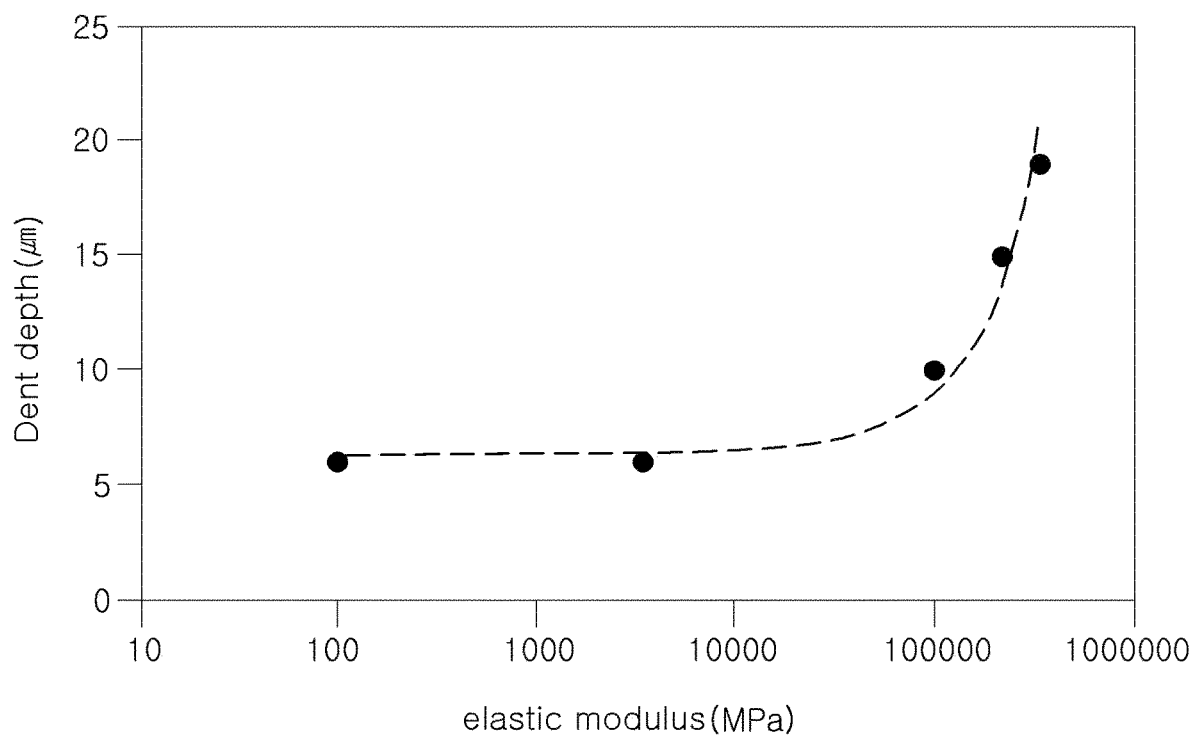
FIG. 6 is a graph illustrating a degree of damage caused by the ball bearing according to an elastic modulus of the ball bearing.

FIG. 6 is a graph illustrating a degree of damage caused by the ball bearing according to an elastic modulus of the ball bearing.

Here, looking at the degree of damage to an object according to the modulus of the ball bearing with reference to FIG. 6, when the elastic modulus of the ball bearing is 20 GPa or more, it can be seen that a depth of dent generated in the object when an impact by the ball bearing is rapidly increased. That is, when the elastic modulus of the ball bearing is 20 GPa or less, it can be seen that a depth of dent generated in the object according to the modulus of the ball bearing is kept constant, but when the elastic modulus of the ball bearing is 20 GPa or more, a depth of dent generated in the object is increased rapidly.

Therefore, conventionally, since the ball bearing is made of a ceramic material, surface defects such as scratches were generated in an object, for example, the housing 210, the carrier 251, the frame 262, and the lens holder 263 as shown in FIG. 2, by the ball bearing during external impacts, resulting in poor driving of the carrier 251, the frame 262, and the lens holder 263.

However, as described above, since the elastic modulus of the ball bearing is 20 GPa or less, and it is made of a material containing a polymer, surface defects such as scratches will not be generated in the carrier 251, the frame 262, and the lens holder 263. Accordingly, it is possible to prevent the occurrence of driving failure of the carrier 251, the frame 262, and the lens holder 263.

As set forth above, there is an effect that can prevent damage to a surface of a rolling portion caused by a ball bearing.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a housing;
   a carrier coupled to the housing and configured to move in an optical axis direction;
   a frame coupled to the carrier and configured to move in a first axis direction perpendicular to the optical axis direction;
   a lens holder coupled to the frame and configured to move in a second axis direction perpendicular to the optical axis direction and the first axis direction;
   a focus adjustment coil disposed on one surface of the housing;
   a focus adjustment magnet disposed on the carrier opposite the focus adjustment coil;
   an autofocusing (AF) ball bearing disposed between the housing and the carrier; and
   an optical image stabilization (OIS) ball bearing disposed either one or both of between the carrier and the frame, and between the frame and the lens holder,
   wherein either one or both of the AF ball bearing and the OIS ball bearing have an elastic modulus of 20 GPa or less, and are made of a polymer material containing an inorganic filler,
   the AF ball bearings comprise a first AF ball bearing and a second AF ball bearing having a smaller size than the first AF ball bearing,
   a predetermined number of the first AF ball bearing and the second AF ball bearing are disposed on the side of the focus adjustment coil or the focus adjustment magnet, and
   the predetermined number of the first AF ball bearing and the second AF ball bearing disposed on the one side of the focus adjustment coil or the focus adjustment magnet is four.

2. The camera module of claim 1, wherein the polymer material is an organic polymer material.

3. The camera module of claim 2, wherein the polymer material is a thermoplastic organic polymer material or a thermosetting organic polymer material.

4. The camera module of claim 1, wherein an equal number of the first AF ball bearing and the second AF ball bearing are disposed on the one side of the focus adjustment coil or the focus adjustment magnet.

5. The camera module of claim 1, wherein a predetermined number of the first AF ball bearing and the second AF ball bearing disposed on another side of the focus adjustment coil or the focus adjustment magnet.

6. The camera module of claim 5, wherein the predetermined number of the first AF ball bearing and the second AF ball bearing disposed on the other side of the focus adjustment coil or the focus adjustment magnet is four.

7. The camera module of claim 6, wherein an equal number of the first AF ball bearing and the second AF ball bearing are disposed on the other side of the focus adjustment coil or the focus adjustment magnet.

8. The camera module of claim 1, wherein the OIS ball bearing comprises a first ball member disposed between the carrier and the frame, and a second ball member disposed between the frame and the lens holder.

9. The camera module of claim 1, wherein the OIS ball bearing comprises a plurality of first ball members and a plurality of second ball members,
   the plurality of first ball members are disposed on an upper surface of the carrier and a corner of a bottom surface of the frame, and
   the plurality of second ball members are disposed on an upper surface of the frame and a corner of a bottom surface of the lens holder.

10. A camera module comprising:
    a housing;
    a carrier coupled to the housing and configured to move in an optical axis direction;
    a frame coupled to the carrier and configured to move in a first axis direction perpendicular to the optical axis direction;
    a lens holder coupled to the frame and configured to move in a second axis direction perpendicular to the optical axis direction and the first axis direction;
    a focus adjustment coil disposed on one surface of the housing;
    a focus adjustment magnet disposed on the carrier opposite the focus adjustment coil;
    a plurality of autofocusing (AF) ball bearings disposed between the housing and the carrier and comprising a first AF ball bearing and a second AF ball bearing having a smaller size than the first AF ball bearing; and
    an optical image stabilization (OIS) ball bearing disposed either one or both of between the carrier and the frame, and between the frame and the lens holder, wherein either one or both of the AF ball bearings and the OIS ball bearing have an elastic modulus of 20 GPa or less, and contain a polymer material, and an equal number of the first AF ball bearing and the second AF ball bearing are disposed on the one side of the focus adjustment coil and the focus adjustment magnet.

11. A camera module comprising:

a housing;

a carrier coupled to the housing and configured to move in an optical axis direction;

a frame coupled to the carrier and configured to move in a first axis direction perpendicular to the optical axis direction;

a lens holder coupled to the frame and configured to move in a second axis direction perpendicular to the optical axis direction and the first axis direction;

a plurality of autofocusing (AF) ball bearings disposed between the housing and the carrier and comprising a first AF ball bearing and a second AF ball bearing having a smaller size than the first AF ball bearing; and an optical image stabilization (OIS) ball bearing disposed either one or both of between the carrier and the frame, and between the frame and the lens holder, wherein either one or both of the AF ball bearings and the OIS ball bearing have an elastic modulus of 20 GPa or less, and contain a polymer material, the OIS ball bearing comprises a plurality of first ball members and a plurality of second ball members, the plurality of first ball members are disposed on an upper surface of the carrier and a corner of a bottom surface of the frame, and the plurality of second ball members are disposed on an upper surface of the frame and a corner of a bottom surface of the lens holder.

* * * * *